(12) United States Patent
Liu et al.

(10) Patent No.: US 7,607,013 B2
(45) Date of Patent: Oct. 20, 2009

(54) METHOD AND APPARATUS FOR ACCESS AUTHENTICATION IN WIRELESS MOBILE COMMUNICATION SYSTEM

(75) Inventors: Weimin Liu, Beijing (CN); Huajun Cao, Beijing (CN); Guang Yang, Beijing (CN)

(73) Assignees: Samsung Electronics Co., Ltd (KR); Beijing Samsung Telecom R&D Center (CN)

(*) Notice: Subject to any disclaimer, the term of this patent is extended or adjusted under 35 U.S.C. 154(b) by 879 days.

(21) Appl. No.: 11/068,188

(22) Filed: Feb. 28, 2005

(65) Prior Publication Data

US 2005/0197104 A1 Sep. 8, 2005

(30) Foreign Application Priority Data

Feb. 27, 2004 (CN) .................. 2004 1 0007550

(51) Int. Cl.
*H04L 9/00* (2006.01)
(52) U.S. Cl. .................. 713/168; 380/247; 380/255; 455/411
(58) Field of Classification Search ............... None
See application file for complete search history.

(56) References Cited

U.S. PATENT DOCUMENTS

| 6,201,871 | B1* | 3/2001 | Bostley et al. ............. 380/249 |
| 6,550,010 | B1* | 4/2003 | Link et al. ................ 713/168 |
| 6,839,434 | B1* | 1/2005 | Mizikovsky ............... 380/247 |
| 2003/0148791 | A1 | 8/2003 | Ahn et al. |
| 2007/0224994 | A1* | 9/2007 | Kakishima et al. .......... 455/436 |

FOREIGN PATENT DOCUMENTS

WO  WO 03/090433  10/2003
WO  WO 2005/032013  4/2005

* cited by examiner

*Primary Examiner*—Nasser G Moazzami
*Assistant Examiner*—Fikremariam Yalew
(74) *Attorney, Agent, or Firm*—The Farrell Law Firm, LLP (57) ABSTRACT

A method for Access Authentication in the High Rate Packet Data Network is proposed in the present invention comprising steps of the AN-AAA receiving the Radius Access Request message sent from the HRPD AN; the AN-AAA judging whether a terminal is a roaming one according to the Network Access ID and transmits the roaming terminal's authentication information to the terminal's home nerwork. If said terminal is a local one, the AN-AAA judges the type of the terminal according to the NAI value. If said terminal is a single-mode one, the AN-AAA works out the Result2 with the MD5 algorithm. if said terminal is in dual-mode, the AN-AAA calculates the Result2 with the CAVE algorithm to compare the Result1 with the Result2.

14 Claims, 9 Drawing Sheets

METHOD AND APPARATUS FOR ACCESS AUTHENTICATION IN WIRELESS MOBILE COMMUNICATION SYSTEM

BACKGROUND OF THE INVENTION

1. Field of the Invention

The present invention relates to a method and Apparatus for Access Network Authentication, Authorization and Accounting server (hereinafter referred to as AN-AAA)in a High Rate Packet Data (hereinafter referred to as HRPD) network, especially to the AN-AAA method of HRPD network that simultaneously supports the CAVE and MD5 algorithms.

(2. Description of the Related Art

Code Division Multiple Access 2000 (hereinafter referred to as cdma2000) network has been widely applied commercially all over the world. In this kind of network, a Challenge Handshake Authentication Protocol (hereinafter referred to as CHAP) based on the Cellular Authentication and Voice Encryption (hereinafter referred to as CAVE) algorithm has been adopted to identify the legitimacy of the access terminals. This authentication system has relatively perfect methods on illegal attack-protecting. A Mobile Station's (hereinafter referred to as MS) privacy key (A-key) and the CAVE algorithm are stored in this MS and the cdma2000 network's authentication center respectively. The authentication process mainly includes such two procedures as the update of Shared Secret Data (SSD) and the implementation of authentication. Part A of the Shared Secret Data (SSD_A) is used for access authentication. According to specific conditions, the network sends a message including a segment of random numbers to the MS and the authentication center respectively to update the SSD_A data. After this message is received by the MS and the authentication center respectively, the included random numbers, the A-key and other parameters are together input into the "SSD_GENEREATION PROCEDURE" to generate an SSD_A through calculation. After conforming the correctness, the old SSD_A is replaced with the new one which will be used as the key for the access authentication. When an authentication is needed to be done on a terminal terminal, the network sends an authentication request message to the MS and the authentication center, including a segment of random numbers. After this message is received by the MS and the authentication center respectively, the authentication result will be calculated with the random numbers included in this message, the SSD_A and other parameters according to the CAVE algorithm. The MS sends authentication results to the authentication center. By comparing the differences between the authentication results, the MS can be authenticated to be valid. To prevent any vicious terminal from stealing others' keys, the SSD_A (which is used as the temporary privacy key) can be updated frequently. Therefore, this authentication mode has very high level of security. In practice, the A-key can be stored in two modes. One is that it is stored in the MS, and the corresponding CAVE algorithm is also implemented in the MS which the card can not be separated from the MS. The other is that the A-key is stored in the Removable User Identification Module (hereinafter referred to as the R-UIM card), and the corresponding CAVE algorithm is also implemented in the R-UIM card which the card is separatable from the MS. At present, only the MSs that the card is separatable from the MS are in service in China, while the MSs that the card can not be separated from the MS are in service in most foreign countries. The HRPD network is the upgrade of cdma2000 network and has been gradually adopted in commercial application all over the world. The HRPD network's access authentication server is called AN-AAA. As prescribed in the corresponding standard of the 3G Partnership Project 2 (hereinafter referred to as 3GPP2), if the access authentication is adopted by the HRPD network, the authentication mode should also be the CHAP authentication, but no detailed encryption algorithm is specified explicitly, which can be specified by the concrete operator. As the cdma2000 network, according to the location where the privacy key is stored, HRPD's access terminals (referred to as AT) can be divided into such two kinds as the one that the card is separatable from the AT and the one that the card can not be separated from the AT.

Figure 6:
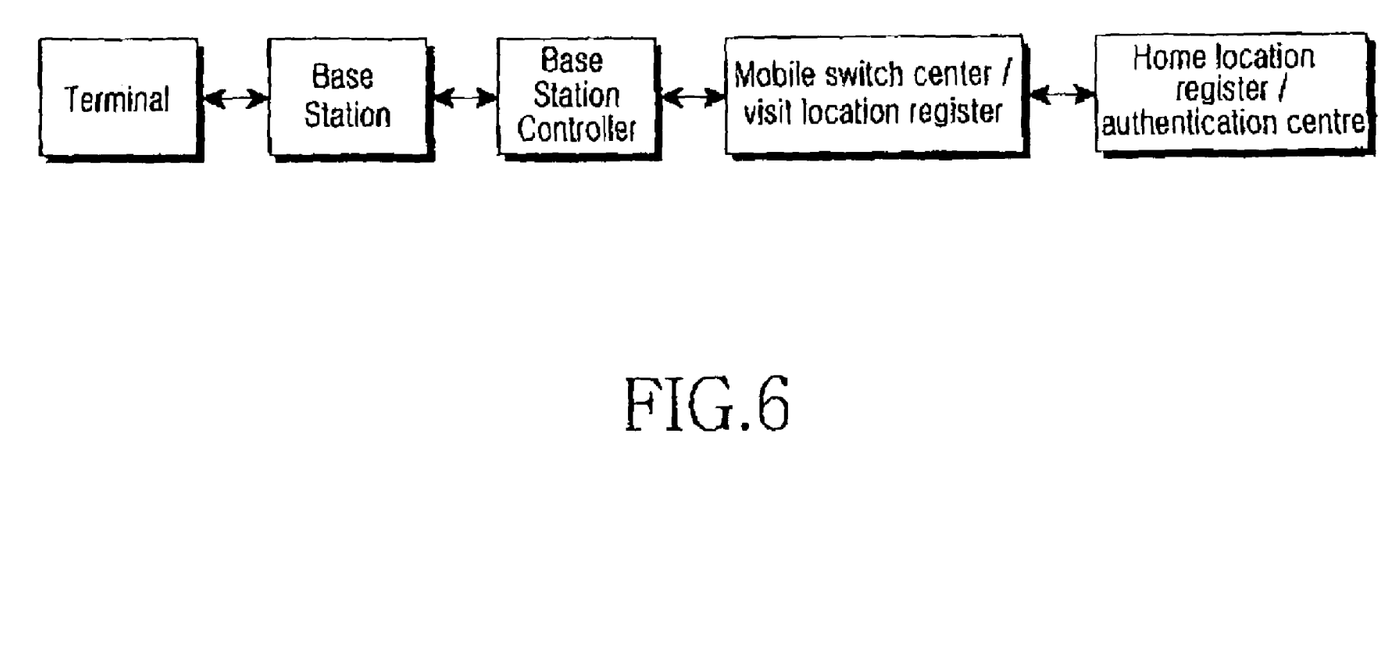
FIG. 6 illustrates a structure of the cdma2000 network.

The HRPD network and the cdma2000 network are independent of each other. The structure of cdma2000 network is illustrated in FIG. 6 in which the information is transferred by terminals. Terminals(610) are linked with base stations(620) via over-the-air interface. The base stations(620) and base station controllers(630) constitute a radio access network for the conversion and process of the terminal's signalling and data. A mobile switch center(640) is responsible for user data and service exchange and is linked with the radio access network via interface A. A visitor location register(640) is used for the management of user's location information and implements the function of local authentication. In practice, it is often set cooperatively with the mobile switch center. A home location register(650) is responsible for saving user's permanent information and resolving the problem of user roaming. The authentication centre(650) is responsible for authentication tasks. In general, local authentication is implemented by the visitor location register(640). In practice, the home location register(650) is often set cooperatively with the authentication centre(650). The visitor location register is linked with the home location register via the interface D under the mobile application protocol ANSI-41.

Figure 7:
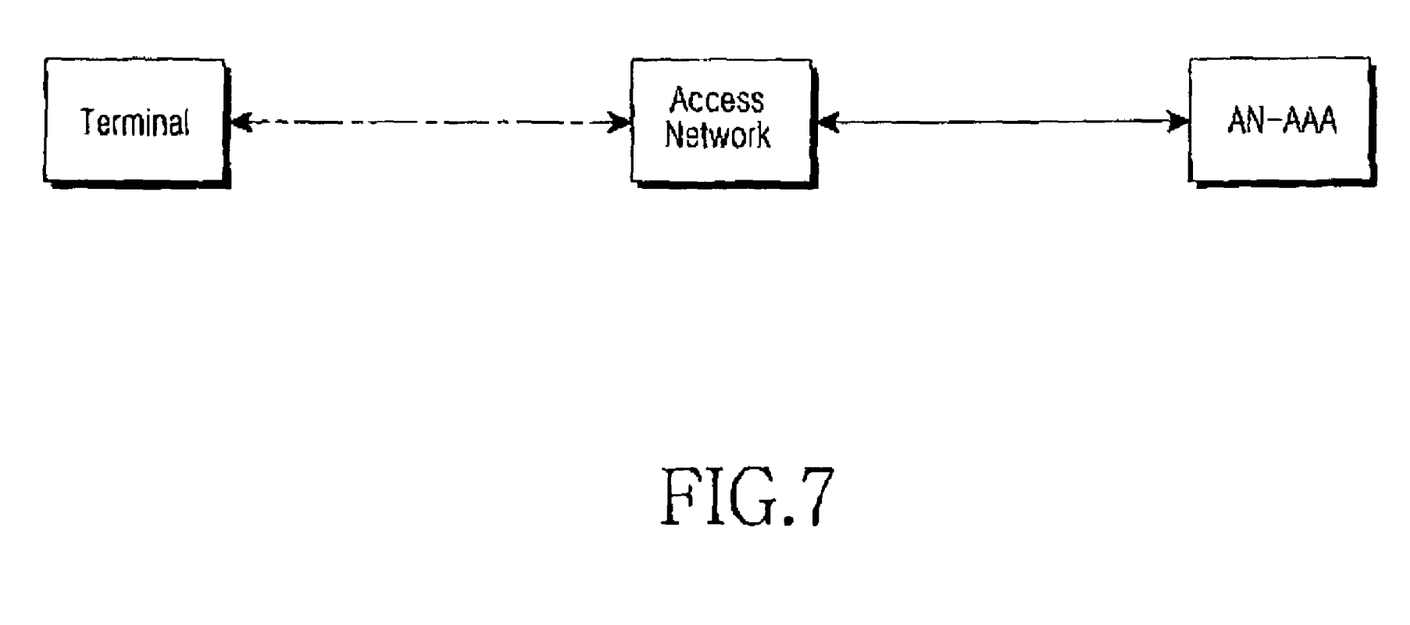
FIG. 7 illustrates a structure of the HRPD network.

FIG. 7 illustrates the structure of the HRPD network in which the information is transferred by terminals(710). The access network(720) offers the function of radio access for users. It is used for the conversion and process of terminal's signalling and data. Terminals(710) are linked with the access network(720) via the over-the-air interface, and the AN-AAA (730) is used for the tasks of authentication, authorization and accounting. In practice, no information exchanges between the cdma2000 network and the HRPD network except that they share the same packet data core network. Because the HRPD network mainly provides terminals with data service, the terminals can share the services through the dual-mode terminals that simultaneously support cdma2000 network and the HRPD network, and this category of terminal is the main cluster of terminals of the HRPD network. In the context, except specifically pointed out, the dual-mode terminals refer to the cdma2000/HRPD ones.

Figure 2:
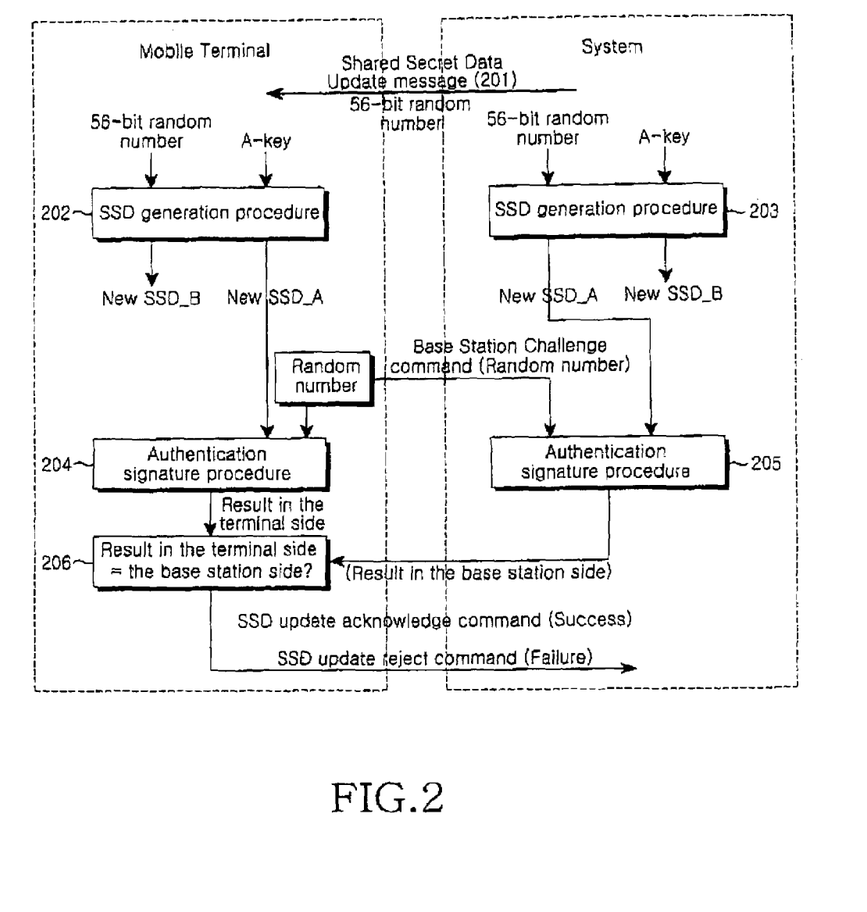
FIG. 2 shows an update process of the shared secret data (SSD) in the cdma2000 network.
Figure 3:
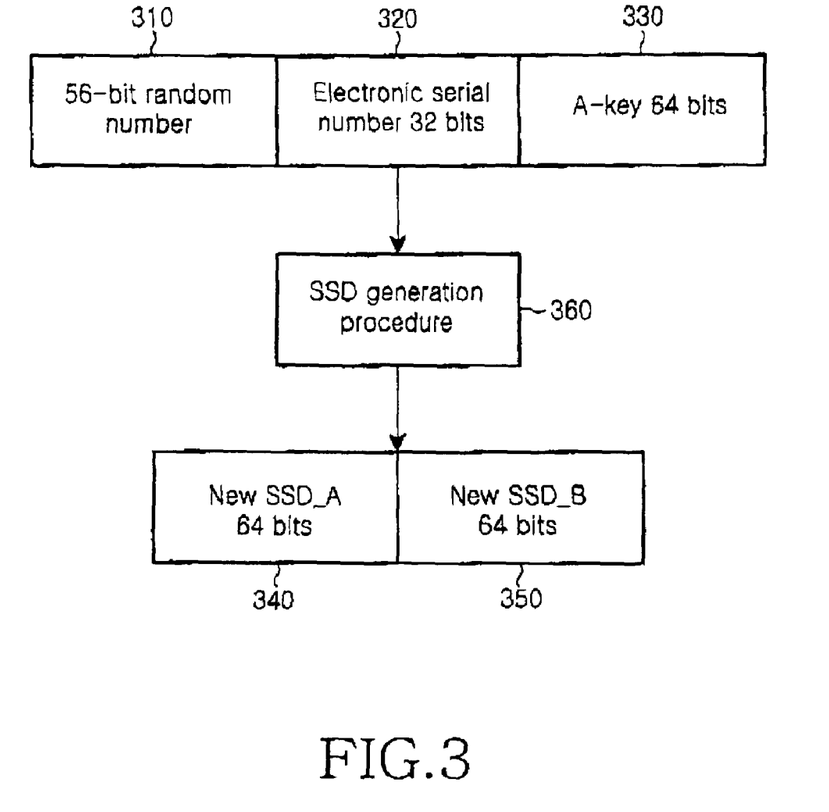
FIG. 3 shows a SSD generation procedure.
Figure 4:
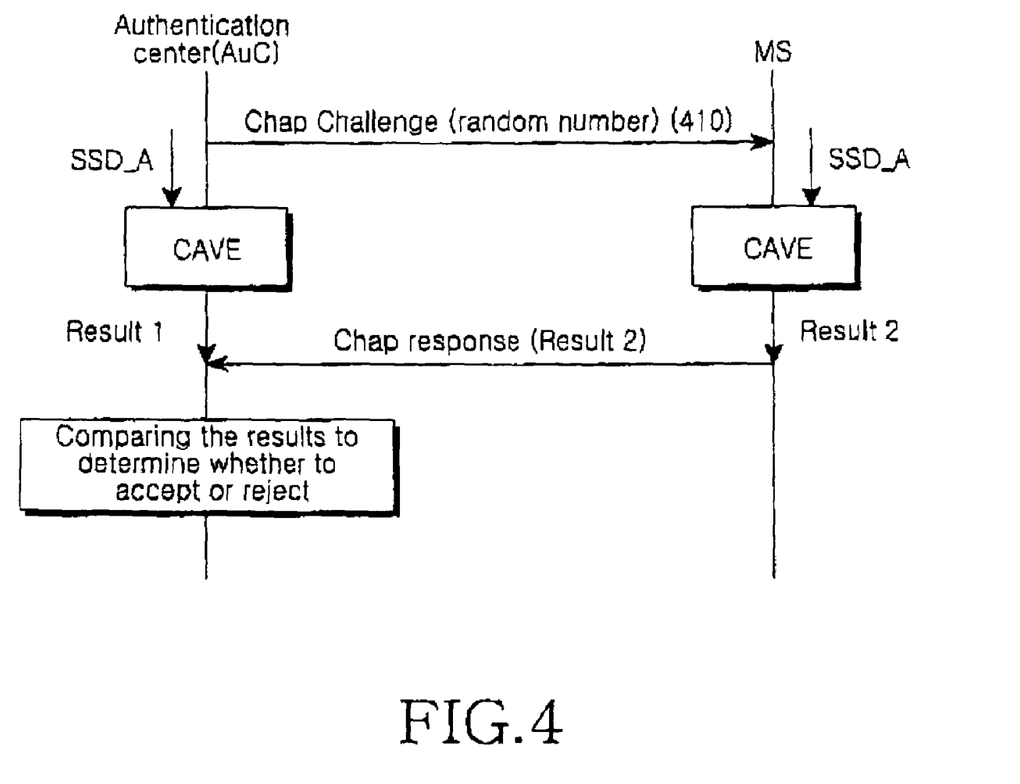
FIG. 4 illustrates a CAVE authentication process.
Figure 5:
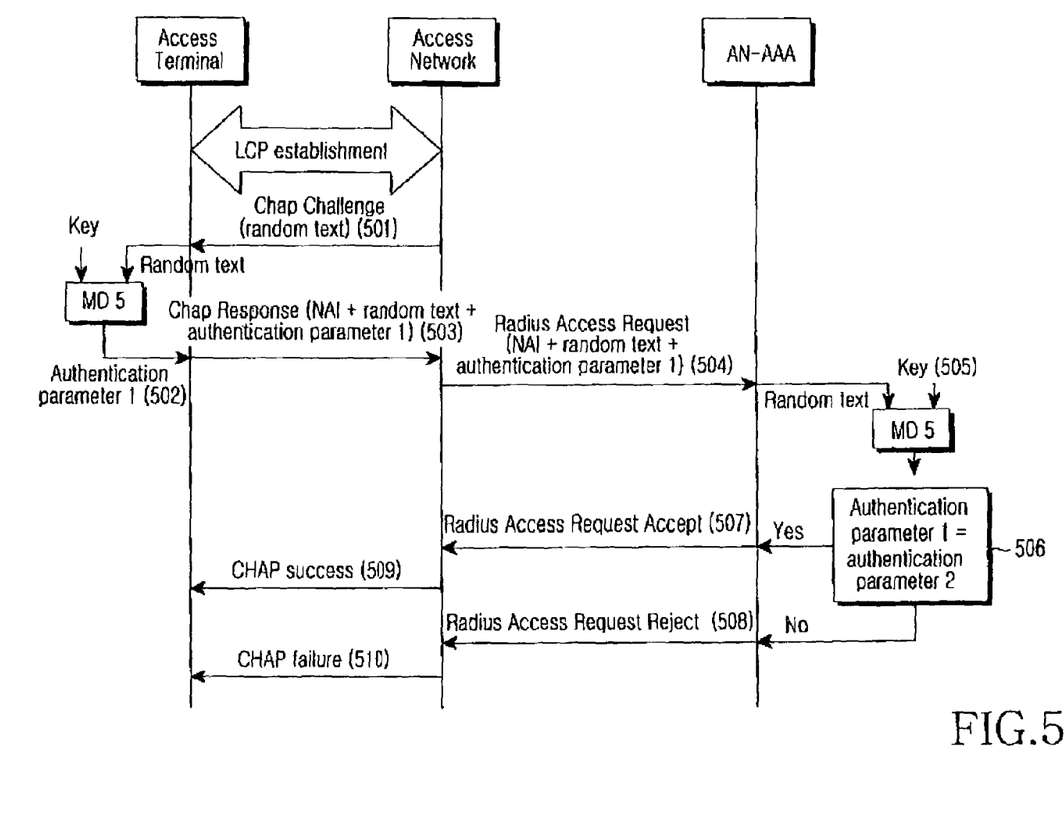
FIG. 5 shows a access authentication message flows in the HRPD network(MD5)

In order to better illustrating the present invention, FIG. 2, FIG. 3 and FIG. 4 are used to describe the operation process in the MS side during the cdma2000 network's authentication process, and FIG. 5 is used to describe the message stream which is defined in 3GPP2 when the access authentication is carried out in the HRPD network.

1) The process in the MS side during the existing cdma2000 network's authentication process.

The operation process in the MS side during the existing cdma2000 network's authentication process consists of two processes: SSD_A update procedure and the authentication procedure.

The SSD_A update process is used for improving the authentication system's capability of attack-protecting. The basic operation process is illustrated in FIG. 2:

a HLR/AC in the system sends a Shared Secrete Data Update Message to a mobile terminal, including RANDSSD which is a 56-bit long random number in step 201;

after receiving the message mentioned above, the mobile terminal initiates a SSD_A generation process. The A-key and the random number above are input into this process to generate a new shared secret data (SSD), which contains part A and part B in step 202;

The same operation is performed in the system side in step 203;

The correctness of the operations performed above must be verified for the mobile terminal and the system. For this end, the mobile terminal generates a segment of random number and sends it to the system simultaneously in step 206. In the terminal side, both this segment of random number and the new SSD_A are input into the authentication signature program to generate a result in the terminal side in step 204;

In the system side, the same authentication signature program is performed to obtain a result of the base station side and the system sends the result of the base station to the terminal in step 205; and The terminal compares the result from the Base Station with the result calculated by itself. If they are just the same, the SSD_A update process completes successfully, and the terminal and the system adopts the new SSD simultaneously, otherwise, the original SSD should be still in service in step 206.

During the process above, the A-key is 64-bit long, which is allocated to an MS by the operator. Only the corresponding MS and the network authentication centre (AuC) know the corresponding A-key. In a practical network, the AuC cooperates with the Home Location Register (i.e., HLR) as the HLR/AuC.

The process of generating the SSD is illustrated in FIG. 3. The parameters including the 56-bit long random number RANDSSD(310), the 32-bit long electronic serial number (in the case of using R-UIM card, which can be the R-UIM ID)(320), and the 64-bit long terminal's password A-key (330) are input into the SSD generation procedure(360). The SSD generation procedure is carried out to generate the part A(340) and part B(350) of the new 64-bit long SSD.

The authentication process is the process of a terminal's legitimacy verification whose basic operations are illustrated in FIG. 4.

The AuC sends a Challenge message to the MS, including a 32-bit long random number RAND in step 410. The MS takes the RAND and the SSD_A as the inputs of the CAVE algorithm to calculate an 18-bit long result AUTH in step 430. Then the MS sends the AUTH to the authentication center by an Authentication Challenge Response message in step 440, and the AuC compares the AUTH with the result worked out by itself with the same method. If they are just the same, the authentication passes, otherwise, this MS is rejected to access the network in step 450.

Because of the roaming problem, the SSD_A is generally shared between the HLR/AuC and the Visitor Location Register (hereinafter referred to as VLR) which is nearer the terminal to speed up the access authentication and reduce network transmission in network implementations. The connection between the VLR and the HLR/AuC is realized via the interface D in the Mobile Application Protocol (MAP) ANSI-41 prescribed by the American National Standards Institute (ANSI), through which an ANSI-41 message is transmitted.

(2) The message flows of the existing HRPD network's access authentication

The HRPD network's access authentication includes following message flows, as shown in FIG. 5:

The access network (AN) sends a CHAP Challenge message to the access terminal (AT), including the random number "Random text" in step 501.

The terminal receives the Chap Challenge message, and then calculates an authentication parameter 1 with the received random number. In the figure, the encryption algorithm MD5 is taken as an example to make further explanations in step 502.

The terminal sends a Chap Response message to the AN, including information of AT's Network Access ID (NAI), random number "text", the authentication parameter 1 and so on in step 503.

After receiving the Chap Response message from the terminal, the AN sends a Radius Access Request message to the AN-AAA, including the three parameters included in the Chap Response message in step 504.

The AN-AAA inputs the random text and the local Password (AN-AAA Password and the AT's Password are just the same) into the MD5 algorithm to calculate an authentication parameter 2 in step 505.

The AN-AAA compares the authentication parameter 1 with the authentication parameter 2 in step 506.

If they are just the same, it sends a Authentication Access Accept message to the AN, indicating that the authentication passes. In this message, the IMSI corresponding to the NAI of this AT is included, which is used for subsequent flows by the AN in step 507.

If the authentication parameter 1 is not the same as the authentication parameter 2, the AN-AAA sends a Authentication Access Reject message to AN to reject the terminal in step 508.

After receiving the Authentication Access Accept message, the AN sends a Chap Success message to the terminal, indicating that the authentication process succeeds in step 509.

And after receiving the Authentication Access Reject message, the AN sends a Chap Failure message to the terminal, indicating that the authentication process fails in step 510.

In the procedures mentioned above, the encryption algorithm MD5 is adopted by the terminal and the AN-AAA. No specification on the adoption of encryption algorithms is given in the international standards while it can be specified by the operator.

In practice, the voice service is provided by means of the cdma2000 network and the data service is provided by means of the HRPD network. Therefore, the dual-mode terminals that support not only the cdma2000 network but also the HRPD network will take up a sizable share. Because the cdma2000 network is generally established ahead of the HRPD network, some terminals of the HRPD network are upgraded from that of the cdma2000 network. In general, the existing MSs whose cards is separatable from them support only the CAVE algorithm during the authentication process. To support the dual-mode operation, the MSs' R-UIM cards should be upgraded to the multi-mode ones, and make them support not only the CAVE algorithm but also the HRPD network's access authentication algorithms like the MD5 algorithm, etc., so as to support this two kinds of networks' authentication simultaneously. Because of a great deal of terminals, the fees spent on the upgrade of R-UIM cards will be very huge, and this operation will bring much inconvenience to the terminals as well, and by far, no multi-mode R-UIM card is on sale yet.

Therefore, as the cdma2000 network has been launched into operation and holds a lot of terminals, how to realize the dual-mode terminal's access authentication with the cost as low as possible is a challenge to the HRPD network construction.

The existing R-UIM cards only support CAVE algorithm, not only the network must be upgraded but also the R-UIM cards must be upgraded to multi-mode ones to upgrade to the HRPD network. However, following problems exsists: 1) no multi-mode R-UIM card is on sale by far; 2) considerable fees should be spent on upgrading the R-UIM cards; and 3) it is inconvenient for the terminals to replace the their R-UIM card.

Although the problems mentioned above will be avoided when the authentication problem can be overcome in terms of the network side, no function or operation flow of authenticating in terms of the HRPD network side is launched to revolve the problems above by far. Thus the present invention is proposed for it.

SUMMARY OF THE INVENTION

An object of the present invention is to provide a method for access authentication in a HRPD network without modifying HRPD message streams, which can support the HRPD network access authentication of dual-mode terminals that adopt CAVE algorithm. In addition, another object of the present invention is to provide an authentication function with which a terminal can realize the HRPD network access authentication by directly inserting an original R-UIM card which is in service in the cdma2000 network into a dual-mode terminal.

To achieve the object mentioned above, a method for access authentication in a HRPD network comprising steps of:

- after receiving a Radius Access Request message from a HRPD AN, an AN-AAA judging a terminal's home location according to a NAI value included in the received message;
- forwarding the access request to the AN-AAA of the terminal's home location for authentication if the AN-AAA determine that the terminal is roaming;
- for a local terminal, the AN-AAA judging the terminal type according to the relevant information such as the NAI value;
- for a cdma2000/HRPD dual-mode terminal, the AN-AAA generating a random number "RAND" that is necessary to calculate the authentication parameter 2 by using the "Random text" included in the Radius Access Request message and calculating an authentication parameter 2 with the RAND with a CAVE algorithm;
- the AN-AAA comparing the authentication parameter 2 with the authentication parameter 1 that is sent from the terminal through the Radius Access Request message, and if they are just the same, the authentication passes, otherwise, the terminal is rejected; and
- for an HRPD single-mode terminal, the AN-AAA adopting a MD5 algorithm to perform authentication, calculating the authentication parameter 2 with the user password and this random number and comparing the authentication parameter 2 with the authentication parameter 1 that is sent from the terminal through the Radius Access Request message, if they are just the same, the authentication passes, otherwise, the terminal is rejected.

In the steps above, the SSD_A in the AN-AAA is obtained from the cdma2000 network. The AN-AAA obtains the SSD_A in virtue of the HLR/AuC of the cdma2000 network.

Figure 8:
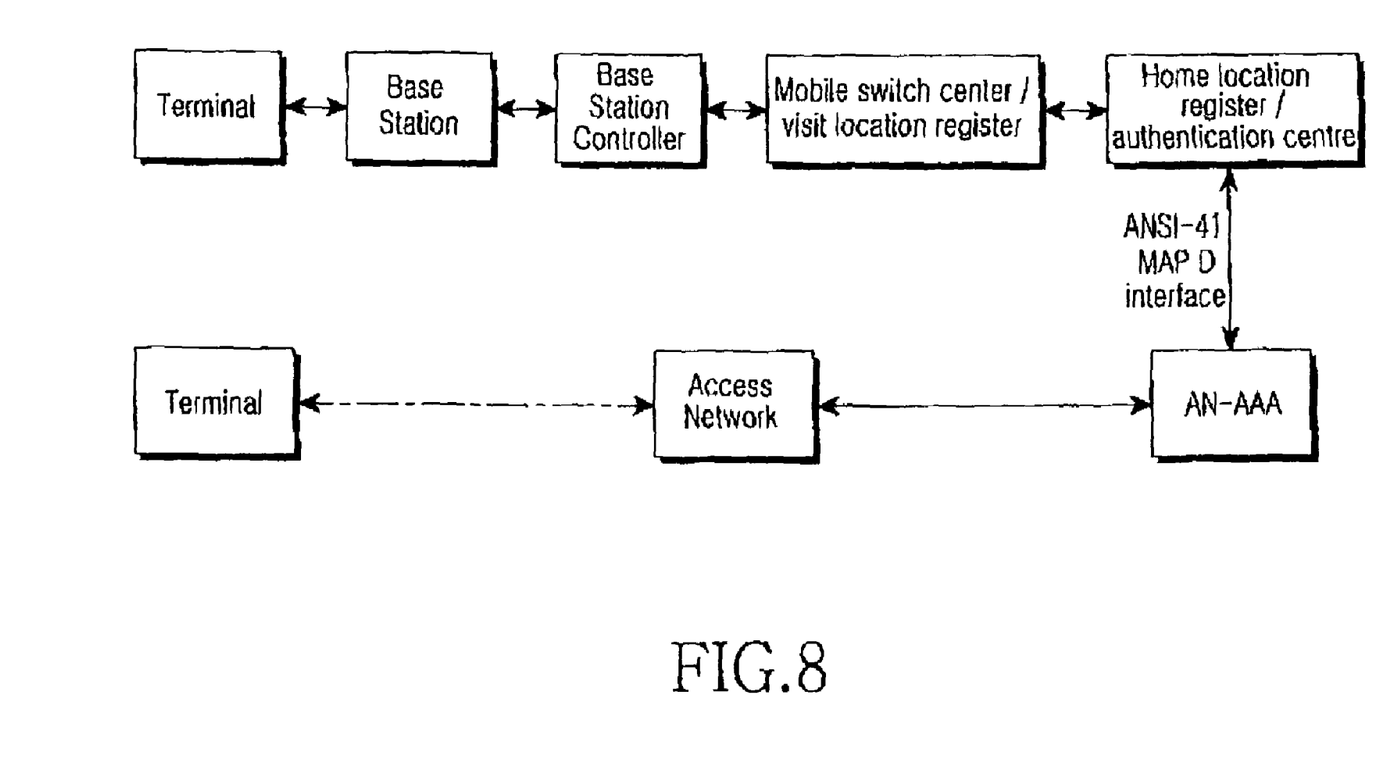
FIG. 8 illustrates a network connection in the case that the SSD_A is shared between the AN-AAA and the HLR/AuC.
Figure 9:
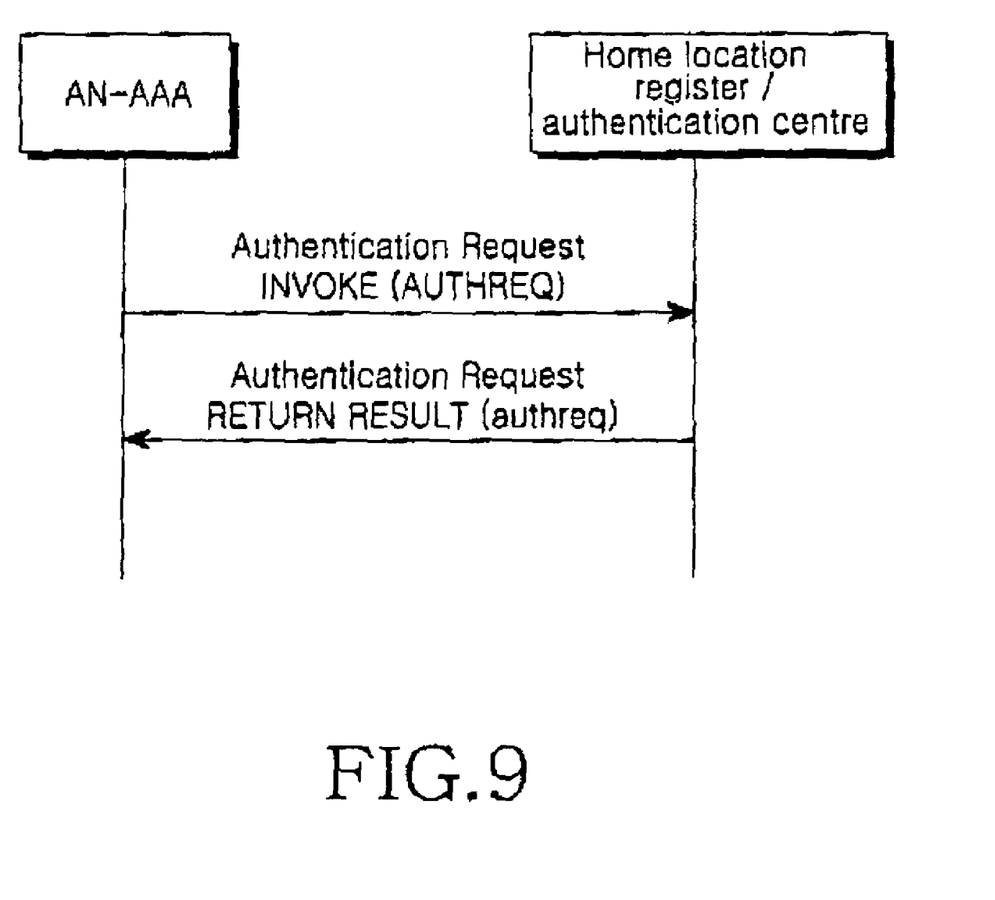
FIG. 9 illustrates a message flow in the case that the SSD_A is shared between the AN-AAA and the HLR/AuC.

In this case, an ANSI-41 channel is needed to be established between the AN-AAA and the HLR/AuC. The AN-AAA is regarded as a virtual VLR of the cdma2000 network, and the sharing of the SSD_A between the AN-AAA and the HLR/AuC is realized by the ANSI-41 messages. FIG. 8 illustrates the network connection in the case that the SSD_A is shared between the AN-AAA and the HLR/AC, and FIG. 9 illustrates a message flow in the case that the SSD_A is shared between the AN-AAA and the HLR/AC. When it is necessary to share the SSD_A, the AN-AAA should construct the Authentication Request Call message according to the contents of the Radius Access Request message and then sends it to the HLR/AC. In the corresponding domains of this message, the support to the CAVE authentication and the sharing of SSD must be specified. If the Chap response message contains the parameter SSD, the AN-AAA will extract the SSD and store for CAVE authentication.

The present invention is adapted to resolve the HRPD network access authentication problem for the cdma2000/HRPD dual-mode terminals based on CAVE authentication algorithm. In this invention, the HRPD network's message flow is not needed to be modified, i.e., neither modification is needed to be done to existing HRPD network access equipments, nor the R-UIM card is needed to be replaced. The AN-AAA realized according to the description of the present invention can implement a terminal's HRPD network access authentication.

DETAILED DESCRIPTION OF THE PREFERRED EMBODIMENTS

The main object of the present invention is to realize the HRPD network's authentication without modifying the large quantities of R-UIM cards used in the existing cdma2000 MSs and the HRPD network's authentication flow. With the AN-AAA according to the present solution, the R-UIM cards can be still in service after the cdma2000 terminals are upgraded to the cdma2000/HRPD dual-mode ones. In general, with the present solution, marked benefits will be gained at very little cost.

The present invention is based on following facts that: the HRPD network does not support the CAVE algorithm, because no message flow that exists in the HRPD network can support the SSD update. However, the existing terminals' R-UIM cards provide only the CAVE algorithm. The main idea of the present invention is to make the existing HRPD message flows support the CAVE algorithm with the method for HRPD network access authentication, and in virtue of the SSD update result of the cdma2000 network and the terminals, the object of not changing existing terminals' R-UIM cards will be achieved.

The authentication problem also can be well resolved for the HRPD single-mode terminals that support the MD5 algorithm according to the present invention.

To enable the HRPD network's AN-AAA to support CAVE-based and MD5-based HRPD access authentications simultaneously without modifying the HRPD's existing message flow, following aspects should be performed by the AN-AAA:

(1) judging whether the terminal is a roaming one by the AN-AAA.

The Radius Access Request message is sent from the HRPD AN for terminal authentication, which includes three parameters of the NAI, the Random text and the Result1. After receiving the Radius Access Request message from the HRPD AN, the AN-AAA determines the terminal's home location according to the NAI domain included in the received message. In the present solution, the NAI value should be formed in the form of IMSI@domain name. According to the domain name in the NAI, the AN-AAA can determine whether this terminal roams from any other operator. If it determines that the terminal roams from any other network, the AN-AAA transmits this terminal's authentication information to the corresponding home network. If it determines that the terminal is local, the AN-AAA will further determine whether the terminal is roaming from another place according to the IMSI in the NAI. If it determines that the terminal is from another place, the AN-AAA will transmit the terminal's authentication information to the AN-AAA of the terminal's home location according to the IMSI.

(2) judging whether the terminal is in single-mode or dual-mode by the AN-AAA.

Since the NAI value is a terminal's unique ID (they are not consistent with one another), the AN-AAA can judge whether the terminal is in single-mode or dual-mode according to the IMSI in the NAI value. If the operator can allocate different IMSI number segmentes to a single-mode terminal and a dual-mode terminal respectively, the AN-AAA can judge the terminal's type according to the number segment which the IMSI belongs to, and a terminal's type judgment can also be made by retrieving special flag bits stored in the AN-AAA in advance according to the IMSI.

(3) processing the access authentication of an HRPD single-mode terminal by the AN-AAA.

For the HRPD single-mode terminal, it is necessary for the AN-AAA to store the terminal's password in advance. The AN-AAA calculates the authentication parameter 2 by the MD5 algorithm with the terminal's password and the "Random text" included in the Radius Access Request message, and compares this result with the authentication parameter 1 fetched by the Result domain of the Radius Access Request message. If they are just the same, the authentication passes, otherwise, the authentication fails.

(4) processing the access authentication of a cdma2000/HRPD dual-mode terminal by the AN-AAA.

4.1 obtaining a terminal's SSD_A in the AN-AAA

To support the CAVE algorithm, the AN-AAA obtains the terminal's SSD_A from the cdma2000 network. The AN-AAA shares the SSD_A via the HLR/AuC of the cdma2000 network. The AN-AAA is regarded as a virtual VLR of the cdma2000 network and the ANSI-41 MAP D interface is established between the AN-AAA and the HLR/AuC. The AN-AAA shares the SSD_A with the cdma2000 network by the normal ANSI-41 messages. 4.2 processing the parameter domain "Random text" included in the Radius Access Request message by the AN-AAA.

The AN-AAA obtains the 32-bit random number according to the Random text. The Random text is a character string presented by octets with length of over 32-bit. It is necessary to convert the octets into binary format and extract 32 bits. No specification is given on the extraction of the 32 bits but the consistency must be kept between the AT and the AN-AAA at all. The AN-AAA calculates the authentication parameter 2 by the CAVE algorithm with the 32-bit random number and the SSD_A obtained with the approach above and other parameters, then compares it with the authentication parameter 1. If they are just the same, the authentication on the terminal passes, otherwise, the terminal is rejected to access the network.

4.3 processing the parameter domain "Result" in the Radius Access Request message by the AN-AAA.

The dual-mode terminal obtains the authentication parameter 1 through the CAVE algorithm, which is carried by the Result domain. Since the Result domain is relatively large, for the format in which the authentication parameter 1 is stored in the Result domain, consistency should be prescribed for the AN-AAA and the dual-mode terminals.

Figure 1:
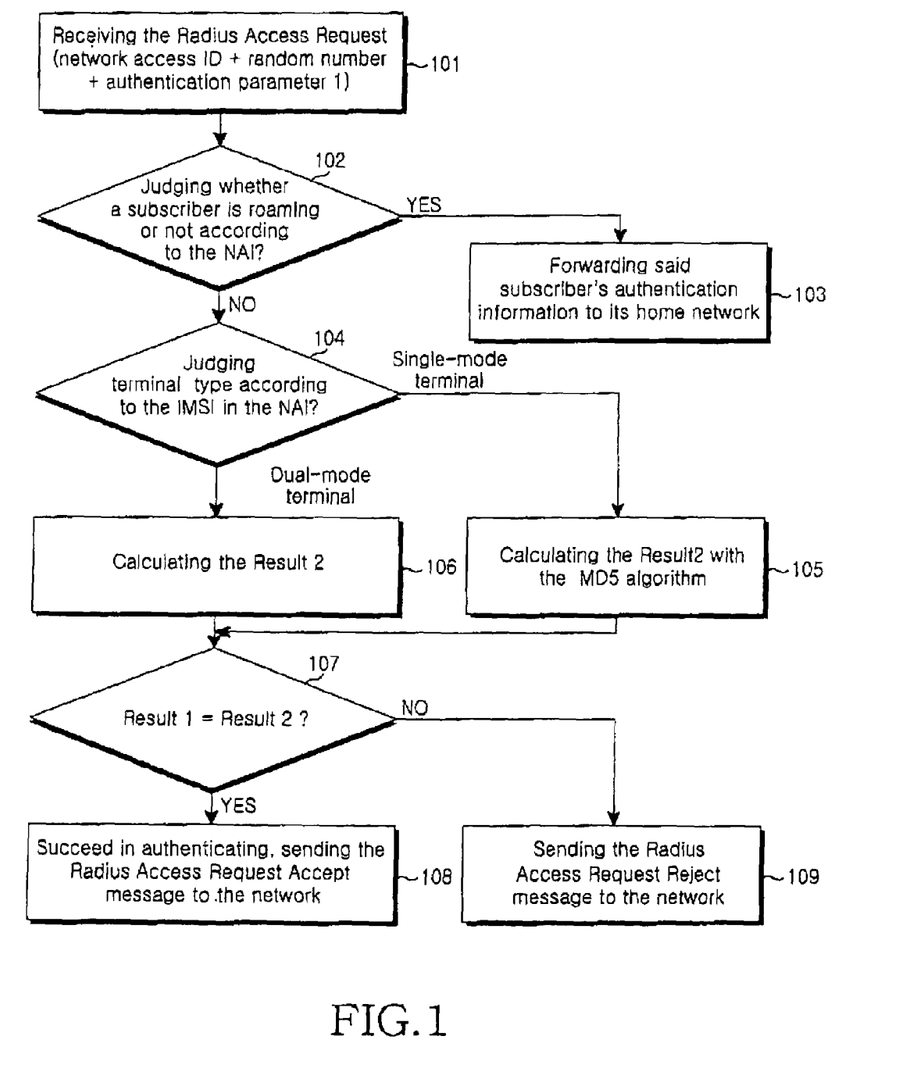
FIG. 1 illustrates a method for access authentication according to the present invention.

FIG. 1 illustrates the method for access authentication in the HRPD network. Now the operation steps will be explained in more detail.

The AN-AAA receives the Radius Access Request message from the HRPD AN, in which parameters of the Network Access ID (NAI), the Random text, the authentication parameter 1 (Result 1) and so on are included in step 101.

The AN-AAA judges whether the terminal is roaming according to the NAI. The AN-AAA judges whether the terminal belongs to the network according to the second half of the NAI. If so, further judgment is made to determine whether the terminal is a local one according to the first half of the NAI in step 102.

If the terminal is roaming, the AN-AAA transmits its authentication information to its home location in step 103.

If the terminal is a local one, the AN-AAA judges the type of the terminal according to the IMSI in the NAI value in step 104.

If the terminal is in single-mode, the AN-AAA calculates the authentication parameter 2 (Result 2) with the MD5 algorithm in step 105.

If the terminal is in dual-mode, the AN-AAA calculates the Result 2 with the CAVE algorithm. Here, the SSD_A is obtained with the previously described approaches by the AN-AAA, and 32 bits extracted out of the random number included in the Radius Access Request message serve as the random number for the CAVE algorithm in step 106.

The Result 1 is compared with the Result 2 in step 107.

If they are equal to, the authentication passes, and the AN-AAA sends a Radius Access Request Accept message to the HRPD AN in step 108.

If they are different, the authentication fails, and the AN-AAA sends a Radius Access Request Reject message to the HRPD AN. Till now, the authentication flow completes. in step 101.

While the present invention has been shown and described with reference to certain embodiments thereof, it should be understood by those skilled in the art that various changes in form and details may be made therein without departing from the spirit and scope of the invention as defined by the appended claims.

What is claimed is:

1. A method for Access Authentication in a wireless mobile communication system, the method comprising steps of:
   determining, by an Access Network Authentication, Authorization and Accounting server (AN-AAA) a type of a terminal requesting access authentication according to one or more parameters in a message received from the terminal;
   selecting a Cellular Authentication and Voice Encryption (CAVE) algorithm or a Message-Digest 5 (MD5) algorithm by the AN-AAA, according to the terminal type;
   calculating a first authentication parameter by the AN-AAA, using the selected algorithm;
   comparing the first authentication parameter with a second authentication parameter received from the terminal; and
   approving an access authentication if the compared result is passed;
   wherein the calculating step comprises calculating the first authentication parameter with the CAVE algorithm if the terminal is in a Code Division Multiple Access 2000 (CDMA2000)/High Rate Packet Data (HRPD) dual-mode terminal, and calculating the first authentication parameter with the MD5 algorithm if the terminal is a High Rate Packet Data (HRPD) single-mode terminal.

2. The method according to claim 1, further comprising:
   determining, by the AN-AAA, whether the terminal is roaming according to a Network Access ID (NAI) in the received message.

3. The method according to claim 1, wherein different International Mobile Subscriber Identity (IMSI) number segments are allocated to single-mode terminals and dual-mode terminals respectively by an operator, and the AN-AAA determines the terminal type according to the IMSI number segments.

4. The method according to claim 1, wherein the determining step comprises determining the terminal's type by retrieving special flag bits stored in the AN-AAA in advance according to an IMSI.

5. The method according to claim 1, further comprising:
   obtaining, from a CDMA2000 network, part A of Shared Secret Data (SSD_A) which is necessary for the CAVE algorithm in the AN-AAA if there is no available SSD_A.

6. The method according to claim 5, wherein the SSD_A is obtained from the Home Location Register (HLR)/Authentication Center (AuC) in the CDMA2000 network.

7. The method according to claim 6, further comprising:
   exchanging messages with the HLR/AuC, which operates as a Visitor Location Register (VLR) and supports messages and procedures required to perform mobile station authentication as defined in interface D of Mobile Application Protocol (MAP-D).

8. The method according to claim 1, wherein the received message comprises parameter domains of an NAI, a Random text and a Result, and for a dual-mode terminal, the second authentication parameter calculated by a Removable User Identification Module (R-UIM) through the CAVE algorithm is stored in the Result domain.

9. The method according to claim 8, wherein the NAI comprises an IMSI and a domain name.

10. The method according to claim 1, wherein a random number (RAND) that the AN-AAA uses when performing the CAVE algorithm is a 32-bit number extracted from a Random Text domain of the received message.

11. A method for Access Authentication in a wireless mobile communication system, the method comprising steps of:
    receiving a message from a terminal requesting access authentication at an Access Network Authentication, Authorization and Accounting server (AN-AAA) including identification, random text and a first authentication parameter;
    calculating a second authentication parameter with the random text by the AN-AAA using a Cellular Authentication and Voice Encryption Algorithm (CAVE) algorithm, if the terminal is in a dual mode;
    comparing the second authentication parameter with the first authentication parameter; and
    approving the access authentication if the compared result is passed;
    wherein the calculating step comprises calculating the second authentication parameter with the random text using a Message Digest 5 (MD5 ) algorithm if the terminal is a High Rate Packet Data (HRPD) single-mode terminal.

12. The method according to claim 11, further comprising:
    sending an accept message when the access authentication is approved.

13. The method according to claim 11, further comprising:
    sending a reject message when the access authentication is not approved.

14. An apparatus for Access Authentication in a wireless mobile communication system comprising:
    an Access Network Authentication, Authorization and Accounting server (AN-AAA) for receiving a message from a terminal requesting access authentication including identification, random text and a first authentication parameter;
    calculating a second authentication parameter with the random text using a Cellular Authentication and Voice Encryption (CAVE) algorithm if the terminal is in a dual mode;
    comparing the second authentication parameter with the first authentication parameter; and approving the authentication if the compared result is passed;
    wherein the calculating step comprises calculating the second authentication parameter with the random text using a Message Digest 5 (MD5) algorithm if the terminal is a High Rate Packet Data (HRPD) single-mode terminal.

* * * * *